(12) United States Patent
Katsuya et al.

(10) Patent No.: US 11,718,718 B2
(45) Date of Patent: Aug. 8, 2023

(54) REFRACTORY MATERIAL

(71) Applicant: KURARAY CO., LTD., Kurashiki (JP)

(72) Inventors: Satoshi Katsuya, Kurashiki (JP);
Yosuke Washitake, Kurashiki (JP);
Ryokei Endo, Chiyoda-ku (JP);
Shunsuke Suiko, Osaka (JP)

(73) Assignee: KURARAY CO., LTD., Kurashiki (JP)

( * ) Notice: Subject to any disclaimer, the term of this patent is extended or adjusted under 35 U.S.C. 154(b) by 386 days.

(21) Appl. No.: 16/877,716

(22) Filed: May 19, 2020

(65) Prior Publication Data

US 2020/0277456 A1    Sep. 3, 2020

Related U.S. Application Data

(63) Continuation of application No. PCT/JP2018/043529, filed on Nov. 27, 2018.

(30) Foreign Application Priority Data

Nov. 28, 2017 (JP) ................. 2017-227421

(51) Int. Cl.
C08J 5/04    (2006.01)

(52) U.S. Cl.
CPC ........... *C08J 5/042* (2013.01); *C08J 2371/10* (2013.01); *C08J 2379/02* (2013.01)

(58) Field of Classification Search
CPC ........ B32B 2262/106; B32B 2260/046; B32B 11/04; B32B 5/04; B32B 27/12; B32B 27/24; C08J 5/042; C08J 5/24; C08J 2369/00; C08J 2371/10; C08J 2379/02; D01F 9/145; Y10T 428/24994; Y10T 428/25; B29C 65/00; B29C 70/12
USPC ......... 428/113, 299.1, 297.4, 220, 323, 325; 264/257, 128, 29.6, 555
See application file for complete search history.

(56) References Cited

U.S. PATENT DOCUMENTS

| 5,153,058 A | 10/1992 | Hall et al. | |
| 2009/0061193 A1* | 3/2009 | Hara | D21H 13/50 428/323 |
| 2015/0140306 A1 | 5/2015 | Endo et al. | |
| 2020/0055276 A1 | 2/2020 | Katsuya et al. | |

FOREIGN PATENT DOCUMENTS

| CN | 105073848 A | 11/2015 |
| EP | 0 396 891 A2 | 11/1990 |
| EP | 2 881 421 A1 | 6/2015 |
| JP | 3-17159 A | 1/1991 |
| JP | 2005-324733 A | 11/2005 |
| JP | 2009-161689 A | 7/2009 |
| JP | 2010-235779 A | 10/2010 |
| JP | 2012-41687 A | 3/2012 |
| JP | 2014-81072 A | 5/2014 |
| JP | 2014-148113 A | 8/2014 |
| JP | 2016-74197 A | 5/2016 |
| JP | 2016-125163 A | 7/2016 |
| JP | 2016-210979 A | 12/2016 |
| JP | 2016210979 | * 12/2016 |
| WO | WO 2014/021084 A1 | 2/2014 |
| WO | WO 2016/121136 A1 | 8/2016 |
| WO | WO 2017/006807 A1 | 1/2017 |
| WO | WO 2018/199091 A1 | 11/2018 |

OTHER PUBLICATIONS

Jang et al., The Thermal Conductivity Measurement using Raman Spectroscopy of Polyacrylonitrile-based Carbon Fibers, Carbon 2018.*
U.S. Appl. No. 14/606,597, filed Jan. 27, 2015, US 2015/0140306, Ryokei Endo, et al.
International Preliminary Report on Patentability and Written Opinion dated Jun. 11, 2020 in PCT/JP2018/043529 (submitting English translation only), 12 pages.
Extended European Search Report dated Jul. 29, 2021 in European Patent Application No. 18882679.6, 6 pages.
International Search Report dated Feb. 19, 2019 in PCT/JP2018/043529 filed Nov. 27, 2018, 2 pages.
Communication pursuant to Article 94(3) EPC dated Mar. 23, 2022 in European Patent Application No. 18882679.6, 7 pages.
Combined Chinese Office Action and Search Report dated Apr. 13, 2022 in Patent Application No. 201880076140.3 (with English machine translation), 12 pages.
Notice of Reasons for Refusal dated May 10, 2022 in Japanese Patent Application No. 2019-557232 (with English machine translation), 12 pages.
Japanese Notification dated Aug. 16, 2022 in Japanese Patent Application No. 2019-557232 (with English machine translation, 15 pages.

* cited by examiner

*Primary Examiner* — Camie S Thompson
(74) *Attorney, Agent, or Firm* — Oblon, McClelland, Maier & Neustadt, L.L.P.

(57) ABSTRACT

Provided is an expansive refractory material that not only has excellent fire resistance but also can provide a heat insulating function for protecting a content by expanding to form a heat insulating layer when the refractory material is brought close to a heat source or comes into contact with flame. The refractory material at least includes: discontinuous reinforcing fibers having a thermal conductivity of 4 W/(m·K) or higher; and a flame-retardant thermoplastic resin, wherein the discontinuous reinforcing fibers are dispersed in the refractory material. The refractory material has a post-expansion porosity of 30% or higher.

12 Claims, No Drawings

REFRACTORY MATERIAL

CROSS REFERENCE TO THE RELATED APPLICATION

This application is a continuation application, under 35 U.S.C. § 111(a), of international application No. PCT/JP2018/043529 filed Nov. 27, 2018, which claims priority to Japanese patent application No. 2017-227421, filed Nov. 28, 2017, the entire disclosures of which are herein incorporated by reference as a part of this application.

BACKGROUND OF THE INVENTION

Field of the Invention

The present invention relates to a refractory material and more specifically to an expansive refractory material.

Description of Related Art

Conventionally, combustible materials are covered with a fire-resistant material for the purpose of enhancing fire protection performance of beams and pillars of buildings and components of aircrafts and automobiles. As an example, there is a technique of directly spraying mineral wool or the like onto combustible members so as to impart a fireproof property. This technique, however, has problems in terms of safety, such as dust generation during the work.

Patent Document 1 proposes a multilayer structure including: a composite material layer including glass fibers and a thermoplastic polymer material; and a wooden base layer attached to the composite material layer. Patent Document 1 describes that exposition to heat and flame makes the composite material to burn decompose, or lose its viscosity so that the fibers constituting a web released from the fixed position are elastically expanded. For example, Patent Document 1 describes in the condition to be kept over vertical flame, the base material of the multilayer structure provided with the composite material reaches 160° C. in 3.6 to 10.8 minutes, whereas the base material of the structure without a composite material reaches 160° C. in 0 to 3.6 minutes.

RELATED DOCUMENT

Patent Document

[Patent Document 1] JP Laid-open Patent Publication No. 3-17159

SUMMARY OF THE INVENTION

In Patent Document 1, however, the fire resistance test is carried out using extremely weak flame, which is not sufficient as a fire resistance test on a practical level.

An object of the present invention is to provide a refractory material that exhibits excellent flame resistance even in a fire resistance test on a practical level and is further capable of heat insulating by expanding to form a heat insulating layer when the refractory material is brought close to a heat source or comes into contact with flame.

The inventors of the present invention have conducted intensive studies to solve the above problem and have found that where a refractory material comprising discontinuous reinforcing fibers having a specific thermal conductivity in combination with a flame-retardant thermoplastic resin is obtained by allowing the refractory material to have a specific porosity when heated at a predetermined temperature, when the refractory material is brought close to a heat source or comes into contact with flame, the refractory material is able to not only exhibit extremely high fire resistance but also to be expanded by itself to form a heat insulating layer, resulting in providing a heat insulating function for protecting a content from heat and flame. The present invention was thus achieved.

That is, the present invention may include the following aspects.

Aspect 1

A refractory material at least comprising: discontinuous reinforcing fibers having a thermal conductivity of 4 W/(m·K) or higher [preferably 6 W/(m·K) or higher, and more preferably 8 W/(m·K) or higher]; and a flame-retardant thermoplastic resin, wherein the discontinuous reinforcing fibers are dispersed in the refractory material,
the refractory material after expansion (preferably, after maximum expansion) has a porosity of 30% or higher [preferably from 30 to 95%, more preferably from 40 to 93%, further preferably 50% or higher (for example, from 50 to 90%), yet more preferably 60% or higher, and particularly 70% or higher].

Aspect 2

The refractory material according to aspect 1, wherein the refractory material after expansion (preferably, after maximum expansion) has a thermal conductivity of 0.15 W/(m·K) or lower (preferably 0.13 W/(m·K) or lower, and more preferably 0.11 W/(m·K) or lower).

Aspect 3

The refractory material according to aspect 1 or 2, wherein the refractory material after expansion (preferably, after maximum expansion) has a thermal resistance of 0.05 m²·K/W or higher (preferably 0.07 m²·K/W or higher, and more preferably 0.1 m²·K/W or higher).

Aspect 4

The refractory material according to any one of aspects 1 to 3, wherein the refractory material has a flexural modulus of 3 GPa or higher (preferably 3.5 GPa or higher, and more preferably 4.0 GPa or higher) and a flexural strength of 50 MPa or higher (preferably 55 MPa or higher, and more preferably 60 MPa or higher).

Aspect 5

The refractory material according to any one of aspects 1 to 4, wherein the flame-retardant thermoplastic resin has a limiting oxygen index of 30 or higher (preferably 32 or higher, and more preferably 35 or higher).

Aspect 6

The refractory material according to any one of aspects 1 to 5, wherein in the refractory material a proportion of the discontinuous reinforcing fibers based on a total amount of a resin matrix (resin component) including the flame-retardant thermoplastic resin and the discontinuous reinforcing fibers is in a range from 15 to 80 wt % (preferably from 17 to 75 wt %, and more preferably from 20 to 70 wt %).

Aspect 7

The refractory material according to any one of aspects 1 to 6, wherein the discontinuous reinforcing fibers have an average fiber length in a range from 2 to 50 mm (preferably from 3 to 50 mm, more preferably from 5 to 35 mm, and most preferably from 10 to 20 mm).

Aspect 8

The refractory material according to any one of aspects 1 to 7, wherein the discontinuous reinforcing fibers include at least one selected from the group consisting of carbon fibers, silicon carbide fibers, alumina fibers, ceramic fibers, basalt fibers, and metal fibers.

Aspect 9

The refractory material according to any one of aspects 1 to 8, wherein the flame-retardant thermoplastic resin includes at least one resin selected from the group consisting of a polyetherimide-series resin, a polysulfone-series resin, a polyethersulfone-series resin, and a polyetheretherketone-series resin.

Aspect 10

A method for producing a refractory material as recited in any one of aspects 1 to 9, the method comprising:

preparing one or more mixed nonwoven fabrics each including a flame-retardant thermoplastic resin in a particulate or fibrous form and discontinuous reinforcing fibers having a thermal conductivity of 4 W/(m·K) or higher [preferably 6 W/(m·K) or higher, and more preferably 8 W/(m·K) or higher]; and heating the one or more overlaid mixed nonwoven fabrics at a temperature equal to or higher than a flow starting temperature of the thermoplastic resin under pressure, followed by cooling the resultant under pressure.

In this specification, the term "refractory material after expansion" means an expanded refractory material due to repulsive force from the fibers therein that is generated upon melt or fluidization of the thermoplastic resin at a predetermined heating temperature. The term "refractory material after maximum expansion" means a maximum-expanded refractory material that is expanded until there is no more visual change in thickness upon melt or fluidization of the thermoplastic resin at a predetermined heating temperature. Although the heating temperature is not specifically limited as long as the thermoplastic resin can melt or be fluidized, it may be, for example, a temperature higher by 100° C. than a glass transition temperature where the resin is an amorphous resin, or a temperature higher by 30° C. than a melting point where the resin is a crystalline resin.

Effect of the Invention

The refractory material of the present invention can exhibit excellent combustion resistance on a practical level and further can expand to form a heat insulating layer, achieving a heat insulating function, when the refractory material is brought close to a heat source or comes into contact with flame.

DESCRIPTION OF THE EMBODIMENTS

Hereinafter, the present invention will be described in detail. A refractory material of the present invention comprises: discontinuous reinforcing fibers having a high thermal conductivity, and a flame-retardant thermoplastic resin, wherein the discontinuous reinforcing fibers are dispersed in the refractory material. Although the refractory material is not specifically limited as long as it can expand to have a predetermined porosity when heated at a predetermined temperature, the refractory material may have, for example, a structure in which the discontinuous reinforcing fibers are dispersed in the flame-retardant thermoplastic resin, and at least some intersections at which the discontinuous reinforcing fibers intersect with each other are bonded with the flame-retardant thermoplastic resin. A method of bonding discontinuous fibers with a flame-retardant thermoplastic resin may include: for example, preparing a mixed nonwoven fabric from fibers made of a flame-retardant thermoplastic resin (hereinafter, referred to as flame-retardant thermoplastic fibers) and discontinuous reinforcing fibers, and boding the discontinuous reinforcing fibers with each other by melting the flame-retardant thermoplastic fibers and cooling them to solidify such that the discontinuous reinforcing fibers are bonded with the flame-retardant thermoplastic resin; or preparing a nonwoven fabric made of discontinuous reinforcing fibers and incorporating a flame-retardant thermoplastic resin in a particulate form (or a granular form) into the nonwoven fabric made of discontinuous reinforcing fibers, and boding the discontinuous reinforcing fibers with each other by melting the thermoplastic resin, and cooling them to solidify such that the discontinuous reinforcing fibers are bonded with the thermoplastic resin.

Discontinuous Reinforcing Fiber

The discontinuous reinforcing fibers used in the present invention have a thermal conductivity of 4 W/(m·K) or higher, and preferably may have a thermal conductivity of 6 W/(m·K) or higher, and more preferably 8 W/(m·K) or higher. Although there is no specific upper limit for the thermal conductivity, it may be 1000 W/(m·K) or lower, 950 W/(m·K) or lower, or 900 W/(m·K) or lower.

Thanks to such a thermal conductivity of the discontinuous reinforcing fibers, heat is diffused along a direction of fiber orientation even when the refractory material comes into contact with flame, making it possible to prevent the flame contact portion from being locally overheated and thereby suppress burning. Thus, excellent fire resistance can be achieved. For example, where glass fibers having a low thermal conductivity are used as the discontinuous reinforcing fibers, heat is hardly diffused, so as to cause local overheat of the flame contact portion, resulting in failing to achieve such excellent fire resistance.

The thermal conductivity of the discontinuous reinforcing fibers in the present invention may be determined in accordance with the method of measurement as described later.

The discontinuous reinforcing fibers are not specifically limited as long as the effects of the present invention are not deteriorated, and examples of the discontinuous reinforcing fibers may include: inorganic fibers, such as carbon fibers, silicon carbide fibers, alumina fibers, ceramic fibers, basalt fibers, and various metal fibers (for example, gold, silver, copper, iron, nickel, titanium, and stainless steel). These discontinuous reinforcing fibers may be used singly or in combination of two or more. Among these, in view of low temperature dependence of tensile modulus, carbon fibers, silicon carbide fibers, alumina fibers, ceramic fibers, basalt fibers, or stainless-steel fibers are preferred.

The discontinuous reinforcing fibers used in the present invention preferably have a tensile modulus of 10 GPa or higher, more preferably 30 GPa or higher, and most preferably 50 GPa or higher, such that the discontinuous reinforcing fibers quickly expand using repulsive force when a heat source is brought close. Although there is no specific upper limit for the tensile modulus, it may be about 1000 GPa.

In order to achieve good repulsive force when the refractory material is brought close to a heat source or comes into contact with flame, the discontinuous reinforcing fibers preferably ensure tensile modulus in a temperature region of 400° C. or lower. The discontinuous reinforcing fibers more preferably ensure tensile modulus in a temperature region of 600° C. or lower. The tensile modulus of the fibers in the present invention may be determined in accordance with the method of measurement as described later.

Although the discontinuous reinforcing fibers used in the present invention may have various lengths as long as a predetermined porosity can be achieved when heated, the discontinuous reinforcing fibers preferably have an average single fiber length preferably falls in a range from 2 to 50 mm, more preferably from 3 to 50 mm, further preferably from 5 to 35 mm, and most preferably from 10 to 20 mm in order to achieve a high expansion rate of the refractory material and improve processability in manufacturing. Where an average fiber length falls within such a range, it is possible to achieve a high expansion rate and provide a sufficient heat insulating property. Where the average single fiber length is too small, a high expansion rate may not be achieved because of reduced repulsive force caused by overlapping the fibers, so as to make it difficult to obtain a sufficient heat insulating property as a refractory material. In contrast, where the average single fiber length is too large, the fibers may be excessively entangled, causing process failure in manufacturing of the refractory material. Thus, the refractory material may not be able to expand uniformly.

The average single fiber length in the present invention may be determined in accordance with the method of measurement as described later.

In order to enhance repulsive force due to overlapping fibers and to increase the number of the constituting fibers, the discontinuous reinforcing fibers have an average diameter of preferably from 2 to 30 μm, more preferably from 4 to 25 μm, and further preferably from 6 to 20 μm. Where the average diameter is too small, a high expansion rate may not be achieved because of reduced repulsive force caused by overlapping the fibers. In contrast, where the average diameter is too large, a high expansion rate may not be achieved because of the reduced number of the constituting fibers. The average diameter of the fibers in the present invention may be determined in accordance with the method of measurement as described later. It should be noted that where each of the discontinuous reinforcing fibers has a modified cross section, the diameter may instead be the diameter of a circumscribed circle of the cross section.

The refractory material preferably has a proportion of the discontinuous reinforcing fibers based on the total amount of the resin matrix and the discontinuous reinforcing fibers in a range from 15 to 80 wt %, more preferably from 17 to 75 wt %, further preferably from 20 to 70 wt %. Where the weight proportion of the discontinuous reinforcing fibers is too low, a high expansion rate may not be achieved because of an insufficient number of the discontinuous reinforcing fibers forming the refractory material. In contrast, where the weight proportion of the discontinuous reinforcing fibers is too high, there is a possibility that mechanical properties as a refractory material may not be achieved because of an insufficient amount of the resin for bonding the discontinuous reinforcing fibers. It should be noted that the resin matrix may include the flame-retardant thermoplastic resin and a binder component that is mixed thereto as needed.

In such a case, a ratio (weight ratio) of the flame-retardant thermoplastic resin relative to the binder component may be, for example, from 99.9/0.1 to 80/20, preferably from 99/1 to 83/17, more preferably from 95/5 to 85/15.

Flame-Retardant Thermoplastic Resin

The flame-retardant thermoplastic resin used in the present invention melts when a heat source is brought close and releases restricting force to the discontinuous reinforcing fibers. As a result, repulsive force of the discontinuous reinforcing fibers is generated, making it possible to cause a refractory material to expand. Although there is no specific limitation for the types of the flame-retardant thermoplastic resin as long as it can be used for a refractory material, in order to enhance flame retardancy, the flame-retardant thermoplastic resin has a limiting oxygen index (LOI) of preferably 30 or higher, more preferably 32 or higher, and further preferably 35 or higher. Although there is no specific upper limit for the LOI, it may be 95.

The limiting oxygen index (LOI) of the flame-retardant thermoplastic resin in the present invention may be determined in accordance with the method of measurement as described later.

The flame-retardant thermoplastic resin used in the present invention may be a crystalline thermoplastic resin or an amorphous thermoplastic resin. In either case, the refractory material of the present invention can expand when the refractory material is brought close to a heat source or comes into contact with flame, so as to achieve a heat insulating function. In particular, in order to protect a content inside such as a combustible or flammable material by the refractory material that covers or embraces the content, it is preferable to select a flame-retardant thermoplastic resin that is plasticized in a temperature region in which the content should be protected. Where the flame-retardant thermoplastic resin is a crystalline thermoplastic resin, it is preferable to select a resin having a melting point that falls within a target temperature region. Where it is an amorphous thermoplastic resin, it is preferable to select a resin having a glass transition temperature that falls within a target temperature region.

In view of heat resistance of the refractory material to maintain its structure even in a high-temperature environment, the crystalline thermoplastic resin preferably has a melting point of 150° C. or higher, more preferably 175° C. or higher, and further preferably 200° C. or higher. Also, the amorphous thermoplastic resin preferably has a glass transition temperature of 100° C. or higher, more preferably 110° C. or higher, and further preferably 120° C. or higher. Although there is no specific upper limit for these temperatures, the crystalline thermoplastic resin preferably has a melting point of 300° C. or lower, and the amorphous thermoplastic resin preferably has a glass transition temperature of 300° C. or lower.

There is no limitation for the flame-retardant thermoplastic resin used in the present invention, and a single resin or a combination of two or more resins may be used. Specific examples may include: a polytetrafluoroethylene-series resin, a polyetherimide-series resin, a polysulfone-series resin, a polyethersulfone-series resin, a semi-aromatic polyamide-series resin, a polyetheretherketone-series resin, a polycarbonate-series resin, and a polyarylate-series resin. Among these resins, a polyetherimide series resin, a polysulfone-series resin, a polyethersulfone-series resin, and a polyetheretherketone-series resin may be preferably used in terms of mechanical properties, flame retardancy, heat resistance, moldability, and availability.

The flame-retardant thermoplastic resin used in the present invention may contain an antioxidant, an antistatic agent, a radical inhibitor, a matting agent, an ultraviolet absorber, a flame retardant, an inorganic substance (excluding the discontinuous reinforcing fibers) as long as the effects of the present invention are not deteriorated. Specific examples of the inorganic substances may include: carbon black, graphite, carbon nanotubes, fullerene, silica, glass beads, glass flakes, glass powder, ceramic beads, boron nitride, silicon carbide, silicates (such as talc, wollastonite, zeolite, sericite, mica, kaolin, clay, pyrophyllite, bentonite, alumina silicate), metal oxides (such as magnesium oxide, alumina, zirconium oxide, titanium oxide, iron oxide), carbonates (such as calcium carbonate, magnesium carbonate, dolomite), sulfates (such as calcium sulfate and barium sulfate), and hydroxides (such as calcium hydroxide, magnesium hydroxide, and aluminum hydroxide), and others.

The flame-retardant thermoplastic resin can take various forms as a resin matrix as long as the discontinuous reinforcing fibers can be dispersed in the refractory material. Example of such forms may include particulate, powder, and fibrous forms and the like. The flame-retardant thermoplastic resin in such forms can be produced by known or conventional methods.

In particular, where the flame-retardant thermoplastic resin is used in a fibrous form, there is no specific limitation on production of the flame-retardant thermoplastic fibers, and a known melt spinning apparatus can be used. That is, the fibers can be obtained by melting and kneading pellets and/or powder of the flame-retardant thermoplastic resin in a melt extruder, guiding the molten polymer to a spinning cylinder, measuring the polymer with a gear pump, and winding yarns discharged from a spinning nozzle. Although the take-up speed in that process may be suitably set depending on the type of the flame-retardant thermoplastic resin and thus is not specifically limited, it is preferable to wind the yarns at a speed in a range from 500 to 4000 m/min in order to avoid unpreferable molecular orientation occurring on a spinning line. A speed below 500 m/min is not preferable in terms of productivity, while a high speed exceeding 4000 m/min is not preferable because it not only proceeds molecular orientation sufficient to cause shrinkage at high temperature but also increases possibility of fiber breakage.

The obtained flame-retardant thermoplastic fibers are preferably undrawn fibers.

The flame-retardant thermoplastic fibers preferably have a single fiber fineness from 0.1 to 10 dtex. In order to obtain a refractory material having excellent mechanical properties and a high expansion rate, it is preferable that the discontinuous reinforcing fibers are uniformly dispersed in the mixed nonwoven fabric as a base material for refractory material (pre-refractory material). Provided that the weight ratio of the flame-retardant thermoplastic fibers is the same, reduced fineness of the single fiber increases the number of the flame-retardant thermoplastic fibers forming the mixed nonwoven fabric, so that it is possible to disperse the discontinuous reinforcing fibers in the mixed nonwoven fabric without unevenness. Where the single fiber fineness is too small, however, the fibers are more easily entangled in the manufacturing process of the nonwoven fabric, making it difficult to uniformly disperse the discontinuous reinforcing fibers. In contrast, where the single fiber fineness is too large, it reduces the number of the flame-retardant thermoplastic fibers forming the mixed nonwoven fabric so that the reduced flame-retardant thermoplastic fibers have difficulty to uniformly disperse the discontinuous reinforcing fiber. The single fiber fineness of the flame-retardant thermoplastic fibers is more preferably from 0.2 to 9 dtex, and further preferably from 0.3 to 8 dtex.

The single fiber fineness in the present invention may be determined in accordance with the method of measurement as described later.

The flame-retardant thermoplastic fibers used in the present invention preferably have an average single fiber length from 0.5 to 60 mm. An excessively small average fiber length is not preferable because it may lead to deterioration in processability, such as falling of fibers during the manufacturing process of nonwoven fabrics and poor drainage in the process particularly where nonwoven fabrics are manufactured by wet papermaking process (wet-laid process). An excessively large average fiber length is not preferable because the fibers may be entangled during the manufacturing process of nonwoven fabrics, making it difficult to uniformly disperse the discontinuous reinforcing fibers. The average single fiber length is more preferably from 1 to 55 mm, and further preferably from 3 to 50 mm. It should be noted that there is no specific limitation on the cross-sectional shape of the fibers, the fibers may have any cross-sectional shape, including a circular shape, a hollow shape, a flat shape, or an irregular shape such as a star shape.

The average single fiber length in the present invention may be determined in accordance with the method of measurement as described later.

Mixed Nonwoven Fabric

The mixed nonwoven fabric used in the present invention preferably has a proportion of a resin component (in particular, the flame-retardant thermoplastic resin such as the flame-retardant thermoplastic fibers) in the mixed nonwoven fabric in a range from 20 to 85 wt %/o. Where the proportion of the resin component (in particular, the flame-retardant thermoplastic resin such as the flame-retardant thermoplastic fibers) is too low, the resin component (in particular, the amount of the flame-retardant thermoplastic resin) is reduced in the obtained refractory material, making it difficult to achieve sufficient mechanical properties. In contrast, where the ratio of the resin component (in particular, the flame-retardant thermoplastic resin) is too high, the refractory material has a lower expansion rate due to a reduced ratio of the discontinuous reinforcing fibers, making it difficult to achieve a sufficient heat insulating property. The proportion more preferably falls in a range from 25 to 83 wt %, and further preferably from 30 to 80 wt %.

The mixed nonwoven fabric may also contain a binder component (for example, binder fibers), as needed. Examples of the binder component may include: water-soluble polymer fibers such as polyvinyl alcohol-series fibers; heat-fusible fibers such as PET-series fibers; and pulp-like materials of para-aramid fibers and of wholly aromatic polyester-series fibers.

The method for producing the mixed nonwoven fabric used in the present invention is not specifically limited and may include spunlacing, needle punching, steam jetting, dry papermaking, and wet papermaking (wet-laid process). Among these processes, wet papermaking is preferable in terms of production efficiency and uniform dispersion of the discontinuous reinforcing fibers in the nonwoven fabric. For example, in wet papermaking, an aqueous slurry containing the flame-retardant thermoplastic fibers and the discontinuous reinforcing fibers may be prepared, and the slurry may be supplied to typical papermaking processes. It should be noted that the aqueous slurry may also contain a binder component (for example, water-soluble polymer fibers such as polyvinyl alcohol-series fibers, heat-fusible fibers such as PET-series fibers, pulp-like materials of para-aramid fibers and of wholly aromatic polyester-series fibers). In order to improve uniformity of the paper material in the papermaking process and a bonding of the paper material under pressure, a binder may be applied by spray drying, or a hot-pressing step may be added after the wet papermaking step.

Although there is no specific limit, the mixed nonwoven fabric may have a basis weight in a range preferably from 5 to 1500 $g/m^2$, more preferably from 10 to 1000 $g/m^2$, and further preferably from 20 to 500 $g/m^2$. An excessively low basis weight may lead to deterioration in processability because of low strength of the nonwoven fabric. An excessively high basis weight may make it difficult to finely adjust the porosity of the refractory material.

The basis weight in the present invention may be determined in accordance with the method of measurement as described later.

Refractory Material

The refractory material of the present invention is a refractory material (or a refractory composite) at least comprising discontinuous reinforcing fibers and a flame-retardant thermoplastic resin, wherein the discontinuous reinforcing fibers are dispersed in the refractory material. In order to disperse the discontinuous reinforcing fibers in the refractory material, a known or conventional manufacturing method may be employed.

For example, a refractory material can be produced by heating one or more overlaid the mixed nonwoven fabrics at a temperature equal to or higher than a flow starting temperature of the flame-retardant thermoplastic fibers under pressure, followed by cooling the resultant under pressure. There is no specific limitation on the method of heat-molding the mixed nonwoven fabric, and general compression molding (such as stampable molding, pressure molding, vacuum compression molding, and GMT molding) is suitably used. The molding temperature in this process may be set in accordance with a flow starting temperature and/or a decomposition temperature of the flame-retardant thermoplastic fibers used. For example, where crystalline flame-retardant thermoplastic fibers are used, the molding temperature is preferably in a range, referring to a melting point of the flame-retardant thermoplastic fibers, from the melting point to (melting point+100)° C. Where amorphous flame-retardant thermoplastic fibers are used, the molding temperature is preferably in a range, referring to a glass transition temperature of the flame-retardant thermoplastic fibers, from the glass transition temperature to (glass transition temperature+200)° C. If needed, preheating can be carried out using an IR heater or the like before heat molding.

Although there is no specific limit for the pressure during heat-molding, it is typically carried out under a pressure of 0.05 N/mm² or higher. Although there is no specific limit for the duration of heat-molding, typically, the heat-molding period is preferably 30 minutes or less because exposure to high temperature for a long period of time may cause deterioration of polymer. Further, the thickness and density of the obtained refractory material can be suitably adjusted in accordance with the type of the discontinuous reinforcing fibers and the pressure to be applied. Furthermore, there is no specific limitation on the shape of the refractory material to be obtained and may be suitably selected. Depending on the purpose, it is also possible to overlay two or more layers of mixed nonwoven fabrics having different specifications or to separately arrange mixed nonwoven fabrics having different specifications in heat-molding.

The refractory material of the present invention is plasticized when the refractory material is brought close to a heat source or comes into contact with flame so that the flame-retardant thermoplastic resin in the refractory material is heated. As a result, the load caused by bent position of the discontinuous fibers in the refractory material is released to allow the refractory material to expand. Thus, when the refractory material is brought close to a heat source or comes into contact with flame, the refractory material expands from the inside to generate voids so as to form a heat insulating layer. Therefore, the refractory material of the present invention has an excellent heat insulating property.

The refractory material of the present invention preferably has a flexural modulus of 3 GPa or higher and a flexural strength of 50 MPa or higher. The flexural modulus is more preferably 3.5 GPa or higher, and further preferably 4.0 GPa or higher. The flexural strength is more preferably 55 MPa or higher, and further preferably 60 MPa or higher. Although there is no specific upper limit for the flexural modulus and the flexural strength, it is preferable that the flexural modulus is 50 GPa or lower, and the flexural strength is 500 MPa or lower. Where the flexural modulus is too low, the refractory material may have insufficient rigidity. Where the flexural strength is too low, the refractory material may have insufficient durability. The flexural modulus and the flexural strength in the present invention may be determined in accordance with the method of measurement as described later.

Since the refractory material of the present invention can expand using repulsive force of the fibers as the thermoplastic resin melts or is fluidized at high temperature, the refractory material after expansion (preferably, after maximum expansion) has a porosity of 30% or higher, preferably from 30 to 95%, more preferably from 40 to 93%, and further preferably from 50 to 90%. For example, heating the refractory material at high temperature may be performed at a temperature higher by 100° C. than the glass transition temperature (Tg) of the flame-retardant thermoplastic resin, i.e., (Tg+100)° C. (where the resin is an amorphous resin) or at a temperature higher by 30° C. than the melting point (Tm), i.e., (Tm+30)° C. (where the resin is a crystalline resin). Particularly preferably, the post-expansion (preferably, post-maximum-expansion) porosity may be 50% or higher, preferably 60% or higher, and further preferably 70% or higher. Where the post-expansion porosity is too low, sufficient voids are not generated inside the refractory material so as to fail to form a heat insulating layer, which may lead to poor heat insulating property. Where the post-expansion porosity is too high, the refractory material may have insufficient mechanical properties.

The post-expansion porosity in the present invention refers to a porosity of a refractory material in an expanded sate, which is determined in accordance with JIS K 7075 "Testing methods for fiber content and porosity of carbon reinforced plastic." In particular, the post-maximum-expansion porosity is a porosity of a refractory material that is heated until there is no more change in thickness. These values may be determined in accordance with the method of measurement as described later.

Although the refractory material of the present invention may have various thicknesses depending on the application, in terms of weight reduction, the refractory material before expansion may have a thickness in a range from, for example, about 0.5 to 10 mm, and preferably from about 0.7 to 8 mm. The refractory material after expansion (preferably, after maximum expansion) may have a thickness in a range from, for example, about 2 to 30 mm, and preferably from about 4 to 25 mm. The thickness of the refractory material in the present invention may be determined in accordance with the method of measurement as described later.

Further, the refractory material after expansion (preferably, after maximum expansion) of the present invention may have a thermal conductivity of 0.15 W/(m·K) or lower, preferably 0.13 W/(m·K) or lower, and more preferably 0.11 W/(m·K) or lower. Where the post-expansion thermal conductivity is too high, a sufficient function for protecting a content may not be provided because heat can easily reach the inside of the refractory material when the refractory material is brought close to a heat source or comes into contact with flame. The post-expansion thermal conductivity in the present invention refers to a thermal conductivity of a refractory material in an expanded state, which is determined in accordance with JIS A 1412-2 "Methods for measuring thermal resistance and thermal conductivity of thermal insulating material—part 2: heat flow meter method (HFM method)." In particular, the post-maximum-expansion thermal conductivity is a thermal conductivity of a refractory material that is heated until there is no more change in thickness. These values may be measured in accordance with the method described later.

In the present invention, the degree of expansion of the inside of the refractory material may also be expressed as, for example, a maximum expansion rate and may be determined in accordance with the method of measurement as described later. The refractory material of the present invention preferably has a maximum expansion rate of 250% or higher, more preferably 300% or higher, further preferably 350% or higher. Where the maximum expansion rate is too low, the refractory material may have a poor heat insulating property because sufficient voids are not generated inside the refractory material when the refractory material is brought close to a heat source or comes into contact with flame, and thus the heat insulating layer is not formed. Although there is no specific upper limit for the maximum expansion rate, it is preferably equal to or lower than 1000% in order to ensure mechanical properties of the refractory material.

The maximum expansion rate in the present invention may be determined in accordance with the method of measurement as described later.

The refractory material after expansion (preferably, after maximum expansion) of the present invention may have a thermal resistance of 0.05 m²·K/W or higher, more preferably 0.07 m²·K/W or higher, and further preferably 0.1 m²·K/W or higher. Although there is no specific upper limit for the thermal resistance, it may be 5 m²·K/W. Where the post-expansion thermal resistance is too low, the refractory material may fail to achieve sufficient function for protecting a content when the refractory material is brought close to a heat source or comes into contact with flame because heat can easily reach the inside of the refractory material.

The post-expansion thermal resistance in the present invention refers to a value obtained from a refractory material in an expanded state calculated by a formula:

Post-expansion thickness($m$)/Post-expansion thermal conductivity($W/(m \cdot K)$).

In particular, the post-maximum-expansion thermal resistance is a thermal resistance of a refractory material that is heated until there is no more change in thickness. These values may be determined in accordance with the method described later.

The refractory material of the present invention preferably has a limiting oxygen index (LOI) of 30 or higher, more preferably 32 or higher, further preferably 34 or higher. An extremely low LOI is not preferable because the refractory material has insufficient fire resistance, and thus the refractory material itself can more easily ignite when the refractory material is brought close to a heat source or comes into contact with flame. Although there is no specific upper limit for the LOI, it is preferably 90 or lower, more preferably 70 or lower, and further preferably 50 or lower. The limiting oxygen index of the refractory material in the present invention may be determined in accordance with the method of measurement as described later.

EXAMPLE

Hereinafter, the present invention will be described further in detail with reference to Examples, which are not intended to limit the present invention in any way whatsoever.

Thermal Conductivity of Fiber

A thermal conductivity of a fiber in a fiber axial direction was determined by the following procedure. That is, a unidirectional fiber material including fibers and an epoxy resin was prepared, and a thermal conductivity of the material in the fiber axial direction was measured using a laser flash method-type thermal constant measuring device "TC-3000" manufactured by SHINKU-RIKO Inc., in accordance with JIS R 1611. A thermal conductivity of the fibers in the fiber axial direction was calculated by the following equation from the measured unidirectional thermal conductivity, a thermal conductivity of the epoxy resin, and a volume content of the fibers.

$$\lambda L = \lambda f V f + \lambda m V m$$

wherein $\lambda L$ is the thermal conductivity of the unidirectional fiber material, $\lambda f$ is the thermal conductivity of the fibers, $\lambda m$ is the thermal conductivity of the epoxy resin, $Vf$ is the volume content of the fibers, and $Vm$ is a volume content of the epoxy resin.

Single Fiber Fineness

In accordance with the method B in section 8.5.1 of JIS L 1015: 2010 "Testing methods for chemical fiber staples," a single fiber fineness was measured using an average fiber length calculated in accordance with the method described below.

Average Fiber Length

Fiber lengths of randomly selected 100 fibers were measured to calculate an average fiber length.

Average Diameter of Fibers

Fiber diameters of randomly selected 30 fibers were measured by microscopic observation to calculate an average fiber diameter.

Tensile Modulus

A tensile modulus of a fiber in the fiber axial direction was determined by the following procedure. That is, a unidirectional fiber material including fibers and an epoxy resin was prepared, and a tensile modulus of the material was measured using a universal testing machine in accordance with JIS K 7165. A tensile modulus of the fibers was calculated by the following equation from the obtained unidirectional tensile modulus, a tensile modulus of the epoxy resin and a volume content of the fibers.

$$EL = EfVf + EmVm$$

wherein $EL$ is the tensile modulus of the unidirectional fiber material, $Ef$ is the tensile modulus of the fibers, $Em$ is the tensile modulus of the epoxy resin, $Vf$ is the volume content of the fibers, and $Vm$ is a volume content of the epoxy resin.

Thickness

Thicknesses of refractory materials before and after expansion were measured. As for each of the refractory materials, the thickness was determined as an average of thicknesses at total 5 locations, i.e., at a center part and parts 1-cm inside the respective corners (4 locations).

Flexural Strength and Flexural Modulus

A flexural strength and a flexural modulus were measured by a three-point flexural test in accordance with JIS K 7017 "Fiber reinforced plastics—determination of flexural properties" (method A, class-I standard test piece).

Maximum Expansion Rate

A maximum expansion rate of a refractory material that was heated until there was no more change in thickness was calculated by the following equation. Where a flame-retardant thermoplastic resin in the refractory material was an amorphous resin, the refractory material was heated at a temperature higher by 100° C. than a glass transition temperature. Where the flame-retardant thermoplastic resin was a crystalline resin, the refractory material was heated at a temperature higher by 30° C. than a melting point.

Maximum expansion rate (%)=Post-expansion thickness($mm$)/Pre-expansion thickness($mm$)×100

Post-Expansion Thermal Conductivity

A post-expansion thermal conductivity of a refractory material after expansion can be determined in accordance with JIS A 1412-2 "Methods for measuring thermal resistance and thermal conductivity of thermal insulating material—part 2: heat flow meter method (HFM method)," where the expanded refractory material is obtained by heating. Heating is carried out at a temperature higher by 100° C. than a glass transition temperature where a flame-retardant thermoplastic resin in the refractory material was an amorphous resin, or at a temperature higher by 30° C. than a melting point where the flame-retardant thermoplastic resin was a crystalline resin. In particular, as for a refractory material after maximum expansion, a post-expansion thermal conductivity of the refractory material that was heated until there was no more change in thickness was determined in accordance with JIS A 1412-2 "Methods for measuring thermal resistance and thermal conductivity of thermal insulating material—part 2: heat flow meter method (HFM method)."

Post-Expansion Thermal Resistance

A post-expansion thermal resistance of a refractory material after expansion can be determined by the following equation, where the expanded refractory material is obtained by heating. Heating is carried out at a temperature higher by 100° C. than a glass transition temperature where a flame-retardant thermoplastic resin in the refractory material was an amorphous resin, or at a temperature higher by 30° C. than a melting point where the flame-retardant thermoplastic resin was a crystalline resin. In particular, as for a refractory material after maximum expansion, a post-expansion thermal resistance of the refractory material that was heated until there was no more change in thickness was determined by the following equation.

Post-expansion thermal resistance($m^2 \cdot K/W$)=Post-expansion thickness($m$)/Post-expansion thermal conductivity($W/(m \cdot K)$)

Post-Expansion Porosity

A post-expansion porosity of a refractory material after expansion can be determined in accordance with JIS K 7075 "Testing methods for fiber content and void ratio of carbon fiber reinforced plastics." The expanded refractory material is obtained by heating at a temperature higher by 100° C. than a glass transition temperature, where a flame-retardant thermoplastic resin in the refractory material is an amorphous resin, or at a temperature higher by 30° C. than a melting point, where the flame-retardant thermoplastic resin was a crystalline resin. In particular, as for a refractory material after maximum expansion, a post-expansion porosity of the refractory material that was heated until there was no more visual change in thickness was determined in accordance with JIS K 7075 "Testing methods for fiber content and void ratio of carbon fiber reinforced plastics."

Limiting Oxygen Index (LOI)

Limiting oxygen indexes (LOI) of a thermoplastic resin and a refractory material were determined in accordance with JIS K 7201-2 "Plastics—determination of burning behavior by oxygen index—part 2: ambient-temperature test" (shape of test piece: IV).

Heat Insulating Property

A refractory material was placed on a stainless-steel net provided at a position 34-mm below an infrared heating section of a toaster oven (KOS-1012). An upper surface of the refractory material was heated at an upper heating mode (560 W) for 10 minutes, and then temperatures of the upper and lower surfaces of the refractory material in a thickness direction were measured using a thermocouple to determine a temperature difference between the upper and lower surfaces for evaluation of a heat insulating property.

Fire Resistance

A refractory material cut into a 50-mm square was placed on a fixing jig, and a thermocouple was attached to a lower surface of the refractory material in a thickness direction thereof. Next, a gas burner was fixed at a position that the burner mouth faced downward, at a height of 50 mm from an upper surface of the refractory material to the burner mouth in the thickness direction (vertical direction). Thereafter the fixing jig was once moved to a place where flame of the gas burner did not reach the refractory material, and the flame from the gas burner (NB GT-9000F, Prince snake fire) was adjusted to have a total flame length of 100 mm at a maximum air amount. Then, the fixing jig was replaced at a center of the flame of the gas burner to measure a temperature increase on the lower surface of the refractory material in a state where the upper surface of the refractory material was in contact with the flame and to determine the time it takes for the lower surface to reach a temperature of 200° C.

Reference Example 1

Production of Polyetherimide Fibers

A polyetherimide (hereinafter, sometimes abbreviated as PEI) series polymer ("ULTEM 9001" manufactured by Sabic Innovative Plastics Co., Ltd.) that was an amorphous resin was vacuum-dried at 150° C. for 12 hours. The PEI-series polymer was discharged from round-hole nozzles at a spinning head temperature of 390° C., a spinning speed of 1500 m/min, and a discharge rate of 50 g/min to produce multifilaments of the PEI-series fibers of 2640 dtex/1200 f. The obtained multifilaments were cut to a length of 15 mm to produce short-cut PEI fibers. The obtained fibers had good appearance without fluff and had a single fiber fineness of 2.2 dtex and an average fiber length of 15.0 mm.

Reference Example 2

Production of Polyetheretherketone Fibers

A polyethertherketone (hereinafter, sometimes abbreviated as PEEK) series polymer ("90G" manufactured by Victrex) was vacuum-dried at 80° C. for 12 hours. The PEEK-series polymer was discharged from round-hole nozzles at a spinning head temperature of 400° C., a spinning speed of 1500 m/min, and a discharge rate of 12.5 g/min to produce multifilaments. The obtained multifilaments were cut to a length of 15 mm to produce short-cut PEEK fibers. The obtained fibers had good appearance without fluff and had a single fiber fineness of 8.8 dtex and an average fiber length of 15.1 mm.

Reference Example 3

Production of PET-Series Binder Fibers

A polycondensation reaction was carried out at 280° C. by a conventional method in a polymerization reactor to produce a PET-series polymer containing terephthalic acid and isophthalic acid at a copolymerization ratio (molar ratio) of 70/30 and 100 mol % of ethylene glycol, and having an intrinsic viscosity (η) of 0.81. The produced polymer was extruded in the form of strands into water from a bottom of the polymerization reactor and was cut into pellets. The obtained PET-series polymer was supplied to a co-rotating vented twin-screw extruder heated to 270° C., retained therein for 2 minutes, guided to a spinning head heated to 280° C., and then discharged from round-hole nozzles at a discharge rate of 45 g/min and taken up at a spinning speed of 1200 m/min to produce multifilaments of the PET-series polymer of 2640 dtex/1200 f. The obtained fibers were cut to a length of 15 mm.

The obtained fibers had good appearance without fluff and had a single fiber fineness of 2.2 dtex, an average fiber length of 10.0 mm, a degree of crystallization of 20%, and an intrinsic viscosity of 0.8. Each fiber had a circular cross-sectional shape.

Example 1

A slurry containing 50 wt % of PEI fibers cut to 15 mm as flame-retardant thermoplastic fibers, 45 wt % of carbon fiber chopped yarns (HTS40 3K, manufactured by Toho Tenax Co., Ltd.: average fiber diameter of 7 μm; thermal conductivity of 10 W/(m·K)) cut to 12.7 mm as discontinuous reinforcing fibers and 5 wt % of PET-series binder fibers cut to 5 mm was prepared. From the slurry, a mixed nonwoven fabric having a basis weight of 100 g/m$^2$ was produced by a wet-laid process.

Then, 31 sheets of the obtained mixed nonwoven fabrics were overlaid and placed in a hot press machine having a clearance set to 2 mm, and then were heated to 340° C. under pressure of 15 MPa applied to a surface perpendicular to an overlay direction so as to make the molten PEI fibers as the PEI resin to be impregnated between the carbon fibers and then cooled to a temperature of 200° C., which was equal to or lower than a glass transition temperature of the PEI resin while maintaining the pressure to produce a refractory material having a thickness of 2.1 mm, a specific gravity of 1.45, a porosity of 1%, a basis weight of 3043 g/m$^2$ and a maximum expansion rate of 511%. The refractory material after expansion had a post-expansion thickness of 10.7 mm and a post-expansion thermal conductivity of 0.09 W/(m·K). Also, the refractory material after expansion had a post-expansion thermal resistance of 0.12 m$^2$·K/W and a post-expansion porosity of 81%, and the refractory material had an LOI of 42.

The obtained refractory material had a flexural strength of 360 MPa and a flexural modulus of 27 GPa, exhibiting excellent mechanical properties. The refractory material had a temperature difference between upper and lower surfaces of 171° C. in the heat insulating property test, indicating an excellent heat insulating property, and it took 95 seconds for the lower surface to reach 200° C. in the fire resistance test, indicating excellent fire resistance.

Example 2

A refractory material was prepared in the same manner as that of Example 1, except that 22 sheets of the mixed nonwoven fabrics were overlaid and that a hot press machine had a clearance set to 1.5 mm. The refractory material had a thickness of 1.5 mm, a specific gravity of 1.45, a porosity of 2%, a basis weight of 2166 g/m$^2$ and a maximum expansion rate of 477%. The refractory material after expansion had a post-expansion thickness of 7.1 mm and a post-expansion thermal conductivity of 0.08 W/(m·K). Also, the refractory material after expansion had a post-expansion thermal resistance of 0.09 m$^2$·K/W and a post-expansion porosity of 79%, and the refractory material had an LOI of 41.

The obtained refractory material had a flexural strength of 365 MPa and a flexural modulus of 27 GPa, exhibiting excellent mechanical properties. The refractory material had a temperature difference between upper and lower surfaces of 144° C. in the heat insulating property test, indicating an excellent heat insulating property, and it took 27 seconds for the lower surface to reach 200° C. in the fire resistance test, indicating excellent fire resistance.

Example 3

A refractory material was prepared in the same manner as that of Example 1, except that 13 sheets of the mixed nonwoven fabrics were overlaid and that a hot press machine had a clearance set to 1 mm. The refractory material had a thickness of 0.9 mm, a specific gravity of 1.46, a porosity of 1%, a basis weight of 1282 g/m$^2$ and a maximum expansion rate of 447%. The refractory material after expansion had a post-expansion thickness of 3.9 mm and a post-expansion thermal conductivity of 0.08 W/(m·K). Also, the refractory material after expansion had a post-expansion thermal resistance of 0.05 m$^2$·K/W and a post-expansion porosity of 78%, and the refractory material had an LOI of 40.

The obtained refractory material had a flexural strength of 370 MPa and a flexural modulus of 28 GPa, exhibiting excellent mechanical properties. The refractory material had a temperature difference between upper and lower surfaces of 80° C. in the heat insulating property test, indicating an excellent heat insulating property, and it took 15 seconds for the lower surface to reach 200° C. in the fire resistance test, indicating excellent fire resistance.

Example 4

A refractory material was prepared in the same manner as that of Example 1, except that 21 sheets of the mixed nonwoven fabrics were overlaid and that a hot press machine had a clearance set to 2 mm. The refractory material had a thickness of 2.0 mm, a specific gravity of 1.03, a porosity of 39%, a basis weight of 2066 g/m$^2$ and a maximum expansion rate of 505%. The refractory material after expansion had a post-expansion thickness of 10.1 mm and a post-expansion thermal conductivity of 0.07 W/(m·K). Also, the refractory material after expansion had a post-expansion thermal resistance of 0.14 m$^2$·K/W and a post-expansion porosity of 88%, and the refractory material had an LOI of 40.

The obtained refractory material had a flexural strength of 122 MPa and a flexural modulus of 5 GPa, exhibiting excellent mechanical properties. The refractory material had a temperature difference between upper and lower surfaces of 151° C. in the heat insulating property test, indicating an excellent heat insulating property, and it took 40 seconds for the lower surface to reach 200° C. in the fire resistance test, indicating excellent fire resistance.

Example 5

A slurry containing 75 wt % of PEI fibers cut to 15 mm as flame-retardant thermoplastic fibers, 20 wt % of carbon fiber chopped yarns (HTS40 3K, manufactured by Toho Tenax Co., Ltd.: average fiber diameter of 7 μm; thermal conductivity of 10 W/(m·K)) cut to 3 mm as discontinuous reinforcing fibers and 5 wt % of PET-series binder fibers cut to 5 mm was prepared. From the slurry, a mixed nonwoven fabric having a basis weight of 100 g/m² was produced by a wet-laid process.

Then, 27 sheets of the obtained mixed nonwoven fabrics were overlaid to produce a refractory material in the same manner as that of Example 1. The obtained refractory material had a thickness of 2.0 mm, a specific gravity of 1.33, a porosity of 1%, a basis weight of 2679 g/m² and a maximum expansion rate of 367%. The refractory material after expansion had a post-expansion thickness of 7.4 mm and a post-expansion thermal conductivity of 0.09 W/(m·K). Also, the refractory material after expansion had a post-expansion thermal resistance of 0.08 m²·K/W and a post-expansion porosity of 73%, and the refractory material had an LOI of 40.

The obtained refractory material had a flexural strength of 232 MPa and a flexural modulus of 13 GPa, exhibiting excellent mechanical properties. The refractory material had a temperature difference between upper and lower surfaces of 122° C. in the heat insulating property test, indicating an excellent heat insulating property, and it took 29 seconds for the lower surface to reach 200° C. in the fire resistance test, indicating excellent fire resistance.

Example 6

A slurry containing 55 wt % of PEI fibers cut to 15 mm as flame-retardant thermoplastic fibers, 40 wt % of carbon fiber chopped yarns (HTS40 3K, manufactured by Toho Tenax Co., Ltd.: average fiber diameter of 7 μm; thermal conductivity of 10 W/(m·K)) cut to 3 mm as discontinuous reinforcing fibers and 5 wt % of PET-series binder fibers cut to 5 mm was prepared. From the slurry, a mixed nonwoven fabric having a basis weight of 100 g/m² was produced by a wet-laid process.

Then, 30 sheets of the obtained mixed nonwoven fabrics were overlaid to produce a refractory material in the same manner as that of Example 1. The obtained refractory material had a thickness of 2.1 mm, a specific gravity of 1.40, a porosity of 3%, a basis weight of 2960 g/m² and a maximum expansion rate of 394%. The refractory material after expansion had a post-expansion thickness of 8.3 mm and a post-expansion thermal conductivity of 0.13 W/(m·K). Also, the refractory material after expansion had a post-expansion thermal resistance of 0.06 m²·K/W and a post-expansion porosity of 75%, and the refractory material had an LOI of 42.

The obtained refractory material had a flexural strength of 258 MPa and a flexural modulus of 19 GPa, exhibiting excellent mechanical properties. The refractory material had a temperature difference between upper and lower surfaces of 109° C. in the heat insulating property test, indicating an excellent heat insulating property, and it took 31 seconds for the lower surface to reach 200° C. in the fire resistance test, indicating excellent fire resistance.

Example 7

A slurry containing 75 wt % of PEI fibers cut to 15 mm as flame-retardant thermoplastic fibers, 20 wt % of carbon fiber chopped yarns (HTS40 3K, manufactured by Toho Tenax Co., Ltd.: average fiber diameter of 7 pun; thermal conductivity of 10 W/(m·K)) cut to 12.7 mm as discontinuous reinforcing fibers and 5 wt % of PET-series binder fibers cut to 5 mm was prepared. From the slurry, a mixed nonwoven fabric having a basis weight of 100 g/m² was produced by a wet-laid process.

Then, 27 sheets of the obtained mixed nonwoven fabrics were overlaid to produce a refractory material in the same manner as that of Example 1. The obtained refractory material had a thickness of 2.0 mm, a specific gravity of 1.35, a porosity of 0%, a basis weight of 2687 g/m² and a maximum expansion rate of 449%. The refractory material after expansion had a post-expansion thickness of 8.9 mm and a post-expansion thermal conductivity of 0.09 W/(m·K). Also, the refractory material after expansion had a post-expansion thermal resistance of 0.10 m²·K/W and a post-expansion porosity of 78%, and the refractory material had an LOI of 40.

The obtained refractory material had a flexural strength of 260 MPa and a flexural modulus of 14 GPa, exhibiting excellent mechanical properties. The refractory material had a temperature difference between upper and lower surfaces of 130° C. in the heat insulating property test, indicating an excellent heat insulating property, and it took 38 seconds for the lower surface to reach 200° C. in the fire resistance test, indicating excellent fire resistance.

Example 8

Preparing a slurry containing 50 wt % of PEEK fibers cut to 15 mm as thermoplastic crystalline fibers, 45 wt % of carbon fiber chopped yarns (HTS40 3K, manufactured by Toho Tenax Co., Ltd.: average fiber diameter of 7 μm; thermal conductivity of 10 W/(m·K)) cut to 3 mm as discontinuous reinforcing fibers and 5 wt % of PET-series binder fibers cut to 5 mm, where a mixed nonwoven fabric having a basis weight of 100 g/m² is produced by a wet-laid process, then, 31 sheets of the obtained mixed nonwoven fabrics are overlaid and placed in a hot press machine having a clearance set to 2 mm, and heated to 380° C. under pressure of 15 MPa applied to a surface perpendicular to an overlay direction so as to make the molten PEEK fibers as the PEEK resin to be impregnated between the carbon fibers and then cooled to a temperature of 100° C. while maintaining the pressure to produce a refractory material, the obtained refractory material is presumed to exhibit a heat dissipation property in the same way as that of the refractory material of Example 1, thanks to the thermal conductivity of the carbon fibers.

Comparative Example 1

A refractory material was produced in the same manner as that of Example 1, except that the carbon fiber chopped yarns had a fiber length of 1 mm and that 30 sheets of the mixed nonwoven fabrics were overlaid. The refractory material had a thickness of 2.0 mm, a specific gravity of 1.47, a porosity of 0%, a basis weight of 2940 g/m² and a maximum expansion rate of 130%. The refractory material after expansion had a post-expansion thickness of 2.6 mm and a post-expansion thermal conductivity of 0.25 W/(m·K). Also, the refractory material after expansion had a post-expansion thermal resistance of 0.01 m²·K/W and a post-expansion porosity of 23%, and the refractory material had an LOI of 42.

The obtained refractory material had a flexural strength of 200 MPa and a flexural modulus of 22 GPa, exhibiting excellent mechanical properties. The refractory material, however, had a temperature difference between upper and lower surfaces of 24° C. in the heat insulating property test, indicating a poor heat insulating property, and it took 9 seconds for the lower surface to reach 200° C. in the fire resistance test, indicating poor fire resistance.

Comparative Example 2

A refractory material was produced in the same manner as that of Example 1, except that the carbon fiber chopped yarns were included in a fiber proportion of 10 wt % and that 26 sheets of the mixed nonwoven fabrics were overlaid. The refractory material had a thickness of 2.0 mm, a specific gravity of 1.31, a porosity of 0%, a basis weight of 2620 g/m² and a maximum expansion rate of 110%. The refractory material after expansion had a post-expansion thickness of 2.2 mm and a post-expansion thermal conductivity of 0.17 W/(m·K). Also, the refractory material after expansion had a post-expansion thermal resistance of 0.01 m²·K/W and a post-expansion porosity of 9%, and the refractory material had an LOI of 38.

The obtained refractory material had a flexural strength of 145 MPa and a flexural modulus of 5 GPa, exhibiting excellent mechanical properties. The refractory material, however, had a temperature difference between upper and lower surfaces of 25° C. in the heat insulating property test, indicating a poor heat insulating property, and it took 10 seconds for the lower surface to reach 200° C. in the fire resistance test, indicating poor fire resistance.

Comparative Example 3

A refractory material was produced in the same manner as that of Example 1, except that polybutylene terephthalate fibers (hereinafter, may be abbreviated as PBT) cut to 6 mm were used as thermoplastic fibers. The refractory material had a thickness of 2.0 mm, a specific gravity of 1.52, a porosity of 0%, a basis weight of 3040 g/m² and a maximum expansion rate of 450%. The refractory material after expansion had a post-expansion thickness of 9.0 mm and a post-expansion thermal conductivity of 0.08 W/(m·K). Also, the refractory material after expansion had a post-expansion thermal resistance of 0.11 m²·K/W and a post-expansion porosity of 78%, and the refractory material had an LOI of 22.

The obtained refractory material had a flexural strength of 250 MPa and a flexural modulus of 24 GPa, exhibiting excellent mechanical properties. The refractory material had a temperature difference between upper and lower surfaces of 150° C. in the heat insulating property test, indicating an excellent heat insulating property. The refractory material, however, quickly ignited and spread flame in 10 seconds after coming into contact with flame in the fire resistance test because the matrix was made of the thermoplastic resin having low flame retardancy. Thus, the refractory material exhibited poor fire resistance.

Comparative Example 4

Injection molding of JD7201 (polyetherimide resin containing 20 wt % of carbon fibers, manufactured by Sabic Innovative Plastics Co., Ltd.) was carried out to produce a molded body, using an injection molding machine (hydraulic clamping: 360 t; maximum injection pressure: 2100/cm²) that set a resin temperature as 400° C. and a mold temperature as 160° C. The obtained molded body had a thickness of 2.0 mm, a specific gravity of 1.35, a porosity of 0%, a basis weight of 2700 g/m² and a maximum expansion rate of 100%. The refractory material after expansion had a post-expansion thickness of 2.0 mm and a post-expansion thermal conductivity of 0.18 W/(m·K). Also, the refractory material after expansion had a post-expansion thermal resistance of 0.01 m²·K/W and a post-expansion porosity of 0%, and the refractory material had an LOI of 39.

The obtained refractory material had a flexural strength of 157 MPa and a flexural modulus of 6 GPa, exhibiting excellent mechanical properties. The refractory material, however, had a temperature difference between upper and lower surfaces of 23° C. in the heat insulating property test, indicating a poor heat insulating property, and it took 8 seconds for the lower surface to reach 200° C. in the fire resistance test, indicating poor fire resistance.

Comparative Example 5

A slurry containing 45 wt % PEI fibers cut to 15 mm as thermoplastic fibers, 50 wt % of glass fiber chopped yarns (CS 13C-897, manufactured by Nitto Boseki Co., Ltd.: average fiber diameter of 10 μm; thermal conductivity of 1 W/(m·K)) cut to 18 mm as discontinuous reinforcing fibers and 5 wt % of PET-series binder fibers cut to 5 mm was prepared. From the slurry, a mixed nonwoven fabric having a basis weight of 100 g/m² was produced by a wet-laid process.

Then, 34 sheets of the obtained mixed nonwoven fabrics were overlaid to produce a refractory material in the same manner as that of Example 1. The obtained refractory material had a thickness of 2.0 mm, a specific gravity of 1.71, a porosity of 0%, a basis weight of 3382 g/m² and a maximum expansion rate of 260%. The refractory material after expansion had a post-expansion thickness of 5.2 mm and a post-expansion thermal conductivity of 0.09 W/(m·K). Also, the refractory material after expansion had a post-expansion thermal resistance of 0.06 m²·K/W and a post-expansion porosity of 62%, and the refractory material had an LOI of 32.

The obtained refractory material had a flexural strength of 240 MPa and a flexural modulus of 11 GPa, exhibiting excellent mechanical properties. The refractory material, however, had a temperature difference between upper and lower surfaces of 51° C. in the heat insulating property test, indicating an inferior heat insulating property to those of Examples 1 to 7. Although it took 23 seconds for the lower surface of the refractory material to reach 200° C. in the fire resistance test because the matrix was made of the flame-retardant thermoplastic resin, the refractory material ignited as the lower surface reached 200° C., indicating poor fire resistance.

Comparative Example 6

A refractory material was prepared in the same manner as that of Comparative Example 5, except that 18 sheets of the mixed nonwoven fabrics were overlaid. The refractory material had a thickness of 1.9 mm, a specific gravity of 0.97, a porosity of 43%, a basis weight of 1798 g/m² and a maximum expansion rate of 363%. The refractory material after expansion had a post-expansion thickness of 6.7 mm and a post-expansion thermal conductivity of 0.06 W/(m·K). Also, the refractory material after expansion had a post-expansion thermal resistance of 0.11 m²·K/W and a post-expansion porosity of 84%, and the refractory material had an LOI of 30.

The obtained refractory material had a flexural strength of 240 MPa and a flexural modulus of 11 GPa, exhibiting excellent mechanical properties. The refractory material had a temperature difference between upper and lower surfaces of 96° C. in the heat insulating property test, indicating a better heat insulating property than that of Comparative Example 5, presumably because the refractory material had a porosity of 43% even before expansion. When compared with Example 4 which had a similar porosity, however, the refractory material had an inferior heat insulating property. Although it took 21 seconds for the lower surface of the refractory material to reach 200° C. in the fire resistance test because the matrix was made of the flame-retardant thermoplastic resin, the refractory material ignited as the lower surface reached 200° C., indicating poor fire resistance.

TABLE 1

| | Item | | | Ex. 1 | Ex. 2 | Ex. 3 | Ex. 4 | Ex. 5 | Ex. 6 | Ex. 7 |
|---|---|---|---|---|---|---|---|---|---|---|
| Composition | | Configuration | | Mixed | Mixed | Mixed | Mixed | Mixed | Mixed | Mixed |
| | Discontinuous reinforcing fiber | Type | | CF | CF | CF | CF | CF | CF | CF |
| | | Thermal conductivity | W/(m·K) | 10 | 10 | 10 | 10 | 10 | 10 | 10 |
| | | Tensile modulus | GPa | 238 | 238 | 238 | 238 | 238 | 238 | 238 |
| | | Fiber length | mm | 12.7 | 12.7 | 12.7 | 12.7 | 3 | 3 | 12.7 |
| | | Fiber diameter | μm | 7 | 7 | 7 | 7 | 7 | 7 | 7 |
| | | Fiber content | wt % | 45 | 45 | 45 | 45 | 20 | 40 | 20 |
| | Flame-retardant thermoplastic resin | Type | | PEI | PEI | PEI | PEI | PEI | PEI | PEI |
| | | LOI | — | 47 | 47 | 47 | 47 | 47 | 47 | 47 |
| | | Content | wt % | 50 | 50 | 50 | 50 | 75 | 55 | 75 |
| | Binder | Type | | PET | PET | PET | PET | PET | PET | PET |
| | | Content | wt % | 5 | 5 | 5 | 5 | 5 | 5 | 5 |
| | Refractory material | Thickness | mm | 2.1 | 1.5 | 0.9 | 2.0 | 2.0 | 2.1 | 2.0 |
| | | Specific gravity | — | 1.45 | 1.45 | 1.46 | 1.03 | 1.33 | 1.40 | 1.35 |
| | | Basis weight | g/m² | 3043 | 2166 | 1282 | 2066 | 2679 | 2960 | 2687 |
| | | Porosity | % | 1 | 2 | 1 | 39 | 1 | 3 | 0 |
| Physical properties of refractory material | | Post-expansion porosity | % | 81 | 79 | 78 | 88 | 73 | 75 | 78 |
| | | Maximum expansion rate | % | 511 | 477 | 447 | 505 | 367 | 394 | 449 |
| | | Post-expansion thickness | mm | 10.7 | 7.1 | 3.9 | 10.1 | 7.4 | 8.3 | 8.9 |
| | | Post-expansion thermal conductivity | W/(m·K) | 0.09 | 0.08 | 0.08 | 0.07 | 0.09 | 0.13 | 0.09 |
| | | Post-expansion thermal resistance | m²·K/W | 0.12 | 0.09 | 0.05 | 0.14 | 0.08 | 0.06 | 0.10 |
| | | LOI | — | 42 | 41 | 40 | 40 | 40 | 42 | 40 |
| Evaluation | | Flexural strength | MPa | 360 | 365 | 370 | 122 | 232 | 258 | 260 |
| | | Flexural modulus | GPa | 27 | 27 | 28 | 5 | 13 | 19 | 14 |
| | | Heat insulating property | ° C. | 171 | 144 | 80 | 151 | 122 | 109 | 130 |
| | | Fire resistance | sec | 95 | 27 | 15 | 40 | 29 | 31 | 38 |

| | Item | | | Com. Ex. 1 | Com. Ex. 2 | Com. Ex. 3 | Com. Ex. 4 | Com. Ex. 5 | Com. Ex. 6 |
|---|---|---|---|---|---|---|---|---|---|
| Composition | | Configuration | | Mixed | Mixed | Mixed | Injection | Mixed | Mixed |
| | Discontinuous reinforcing fiber | Type | | CF | CF | CF | CF | GF | GF |
| | | Thermal conductivity | W/(m·K) | 10 | 10 | 10 | 10 | 1 | 1 |
| | | Tensile modulus | GPa | 238 | 238 | 238 | 238 | 75 | 75 |
| | | Fiber length | mm | 1 | 12.7 | 12.7 | — | 18 | 18 |
| | | Fiber diameter | μm | 7 | 7 | 7 | 7 | 10 | 10 |
| | | Fiber content | wt % | 45 | 10 | 45 | 20 | 50 | 50 |
| | Flame-retardant thermoplastic resin | Type | | PEI | PEI | PBT | PEI | PEI | PEI |
| | | LOI | — | 47 | 47 | 21 | 47 | 47 | 47 |
| | | Content | wt % | 50 | 85 | 50 | 75 | 45 | 45 |
| | Binder | Type | | PET | PET | PET | PET | PET | PET |
| | | Content | wt % | 5 | 5 | 5 | 5 | 5 | 5 |
| | Refractory material | Thickness | mm | 2.0 | 2.0 | 2.0 | 2.0 | 2.0 | 1.9 |
| | | Specific gravity | — | 1.47 | 1.31 | 1.52 | 1.35 | 1.71 | 0.97 |
| | | Basis weight | g/m² | 2940 | 2620 | 3040 | 2700 | 3382 | 1798 |
| | | Porosity | % | 0 | 0 | 0 | 0 | 0 | 43 |
| Physical properties of refractory material | | Post-expansion porosity | % | 23 | 9 | 78 | 0 | 62 | 84 |
| | | Maximum expansion rate | % | 130 | 110 | 450 | 100 | 260 | 363 |
| | | Post-expansion thickness | mm | 2.6 | 2.2 | 9.0 | 2.0 | 5.2 | 6.7 |
| | | Post-expansion thermal conductivity | W/(m·K) | 0.25 | 0.17 | 0.08 | 0.18 | 0.09 | 0.06 |
| | | Post-expansion thermal resistance | m²·K/W | 0.01 | 0.01 | 0.11 | 0.01 | 0.06 | 0.11 |
| | | LOI | — | 42 | 38 | 22 | 39 | 32 | 30 |
| Evaluation | | Flexural strength | MPa | 200 | 145 | 250 | 157 | 240 | 240 |
| | | Flexural modulus | GPa | 22 | 5 | 24 | 6 | 11 | 11 |
| | | Heat insulating property | ° C. | 24 | 25 | 150 | 23 | 51 | 96 |
| | | Fire resistance | sec | 9 | 10 | Ignited | 8 | Ignited | Ignited |

Table 1 reveals that since the refractory materials of Examples 1 to 7, which are fiber-reinforced resin refractory materials including discontinuous reinforcing fibers having a high thermal conductivity and a flame-retardant thermoplastic resin, have post-expansion porosities of 50% or higher after expanding at high temperature, the refractory materials are excellent in fire resistance and achieve heat insulating function thanks to heat insulating layer formation by expansion.

Where the refractory material after expansion has a thermal conductivity of 0.15 W/(m·K) or lower, the refractory material can effectively suppress heat conduction at high temperature, and reduce undesirable impact from high temperature on a surface of the refractory material even if the other surface thereof is exposed to the high temperature. In such a case, the refractory material not only has excellent fire resistance but also can achieve heat insulating function for protecting a content by expanding to form a heat insulating layer even when the refractory material is brought close to a heat source or comes into contact with flame.

In contrast, the refractory materials of Comparative Examples 1, 2 and 4 have post-expansion porosities lower than 23%, resulting in poor fire resistance as well as deteriorated heat insulating properties. Comparative Example 3, using as the thermoplastic resin PBT having low flame retardancy, has poor fire resistance.

Although Comparative Examples 5 and 6 expand to form voids and exhibit higher heat insulating properties than those of Comparative Examples 1 and 2, Comparative Examples 5 and 6 accumulate heat thereinside due to low thermal conductivity of the discontinuous reinforcing fibers and thus ignite in about 20 seconds, indicating poor fire resistance.

INDUSTRIAL APPLICABILITY

An expansive refractory material obtained by the present invention has excellent fire resistance and can provide a heat insulating function for protecting a content by expanding to form a heat insulating layer when the refractory material is brought close to a heat source or comes into contact with flame. Therefore, the refractory material may be suitably applied as construction materials such as floor materials, ceiling materials and wall materials, as well as interior materials and structural members for transportation vehicles such as automobiles, airplanes and railway cars.

Although the preferred embodiments of the present invention have been described with reference to the drawings, various additions, modifications, or deletions may be made without departing from the scope of the invention. Accordingly, such variants are included within the scope of the present invention.

What is claimed is:

1. A refractory material at least comprising: discontinuous reinforcing fibers having a thermal conductivity of 4 W/(m·K) or higher; and a flame-retardant thermoplastic resin, wherein the discontinuous reinforcing fibers are dispersed in the flame-retardant thermoplastic resin to form the refractory material,
wherein the refractory material after expansion has a porosity of 30% or higher.

2. The refractory material according to claim 1, wherein the refractory material after expansion has a thermal conductivity of 0.15 W/(m·K) or lower.

3. The refractory material according to claim 1, wherein the refractory material after expansion has a thermal resistance of 0.05 $m^2$·K/W or higher.

4. The refractory material according to claim 1, wherein the refractory material has a flexural modulus of 3 GPa or higher and a flexural strength of 50 MPa or higher.

5. The refractory material according to claim 1, wherein the flame-retardant thermoplastic resin has a limiting oxygen index of 30 or higher.

6. The refractory material according to claim 1, wherein in the refractory material a proportion of the discontinuous reinforcing fibers based on a total amount of a resin matrix including the flame-retardant thermoplastic resin and the discontinuous reinforcing fibers is in a range from 15 to 80 wt %.

7. The refractory material according to claim 1, wherein the discontinuous reinforcing fibers have an average fiber length in a range from 2 to 50 mm.

8. The refractory material according to claim 1, wherein the discontinuous reinforcing fibers include at least one selected from the group consisting of carbon fibers, silicon carbide fibers, alumina fibers, ceramic fibers, basalt fibers, and metal fibers.

9. The refractory material according to claim 1, wherein the flame-retardant thermoplastic resin includes at least one resin selected from the group consisting of a polyetherimide-series resin, a polysulfone-series resin, a polyethersulfone-series resin, and a polyetheretherketone-series resin.

10. A method for producing a refractory material as recited in claim 1, the method comprising:
preparing one or more mixed nonwoven fabrics each at least including a flame-retardant thermoplastic resin in a particulate or fibrous form and discontinuous reinforcing fibers having a thermal conductivity of 4 W/(m·K) or higher; and
heating the one or more overlaid mixed nonwoven fabrics at a temperature equal to or higher than a flow starting temperature of the thermoplastic resin under pressure, followed by cooling the resultant under pressure.

11. The refractory material according to claim 1, wherein the discontinuous fibers in bent state are restricted by the flame-retardant thermoplastic resin.

12. The method according to claim 10, wherein the material after cooling has discontinuous fibers in bent state restricted by the flame-retardant thermoplastic resin.

* * * * *